United States Patent

Limberg

(10) Patent No.: US 6,307,595 B1
(45) Date of Patent: Oct. 23, 2001

(54) NTSC/DTV RECEPTION APPARATUS AUTOMATICALLY CONDITIONED FOR NTSC SIGNAL RECEPTION RESPONSIVE TO 4.5 MHZ INTERCARRIER

(75) Inventor: Allen LeRoy Limberg, Vienna, VA (US)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/217,632

(22) Filed: Dec. 22, 1998

Related U.S. Application Data

(60) Provisional application No. 60/071,288, filed on Jan. 13, 1998.

(51) Int. Cl.[7] .............................. H04N 3/27; H04N 5/44; H04N 5/46; H04N 5/62; H04N 5/455
(52) U.S. Cl. ..................... 348/558; 348/555; 348/737; 348/725; 348/729
(58) Field of Search .................. 348/554, 555, 348/556, 558, 737, 725, 726, 729, 735; H04N 3/27, 5/46, 5/62, 5/44, 5/455

(56) References Cited

U.S. PATENT DOCUMENTS

| 4,329,714 | * | 5/1982 | Pritchard | 358/198 |
|---|---|---|---|---|
| 4,511,924 | * | 4/1985 | Griffis et al. | 358/197 |
| 4,514,763 | * | 4/1985 | Rindal | 358/167 |
| 4,602,288 | * | 7/1986 | Everett | 358/197 |
| 4,825,286 | * | 4/1989 | Graves | 358/143 |
| 5,132,793 | * | 7/1992 | Hirahata et al. | 358/140 |
| 5,461,427 | * | 10/1995 | Duffield et al. | 348/555 |
| 5,557,337 | * | 9/1996 | Scarpa | 348/558 |
| 5,671,253 | * | 9/1997 | Stewart | 348/555 |
| 5,959,699 | * | 9/1999 | Patel et al. | 348/558 |
| 6,005,640 | * | 12/1999 | Strolle et al. | 348/555 |
| 6,057,889 | * | 5/2000 | Reitmeier et al. | 348/555 |

* cited by examiner

Primary Examiner—Reinhard J. Eisenzopf
Assistant Examiner—Brian P. Yenke
(74) Attorney, Agent, or Firm—Robert E. Bushnell, Esq.

(57) ABSTRACT

Television signal reception apparatus for receiving a television signal selected from among transmitted television signals of different types includes a respective receiver portion for each of the different types. The current reception or non-reception of NTSC signal is detected by ascertaining whether or not 4.5 MHz intercarrier sound intermediate-frequency signal is generated in the receiver portion used for NTSC signal reception. When reception of NTSC signal is detected, the television signal reception apparatus is automatically conditioned for selecting the demodulated NTSC signal for further processing.

8 Claims, 1 Drawing Sheet

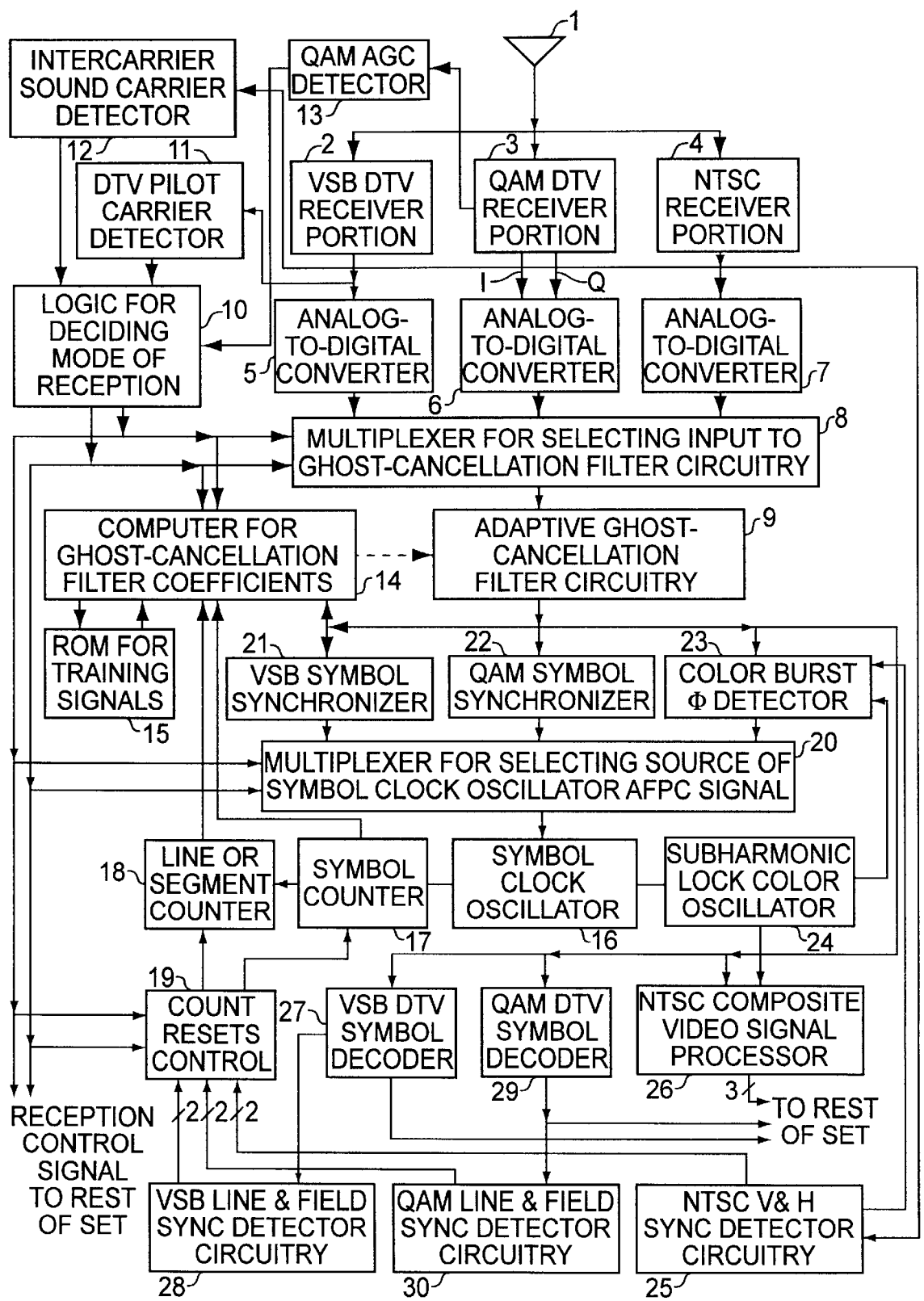

NTSC/DTV RECEPTION APPARATUS AUTOMATICALLY CONDITIONED FOR NTSC SIGNAL RECEPTION RESPONSIVE TO 4.5 MHZ INTERCARRIER

This application is filed under 35 U.S.C. 111 (a) claiming pursuant to 35 U.S.C. 119(e)(1) benefit of the filing date of provisional application serial No. 60/071,288 filed Jan. 13, 1998, filed pursuant to 35 U.S.C. 111(b).

The invention relates to NTSC/DTV television receivers, which have capability both for receiving analog television signals transmitted in accordance with the NTSC standard and for receiving digital television (DTV) signals.

BACKGROUND OF THE INVENTION

In the United States digital television signals broadcast over the air in accordance with the ATSC standard are transmitted using channel allocations similar to those used to broadcast analog television signals over the air in accordance with the NTSC standard. During the period of transition from broadcasting NTSC signals to broadcasting ATSC signals, television signal receivers capable of receiving signals broadcast according to each of these standards will be used. These television signal receivers may be complete television sets with viewscreens, set-top converters for NTSC receivers already in the field, television signal receivers for use with color television monitors, or television signal receivers which recover data for recording rather than presentation on a viewscreen. It is desirable that these NTSC/DTV receivers be capable of being automatically conditioned for operation in an NTSC reception mode responsive to the reception of an NTSC broadcast signal.

It is also likely that cablecasting of both NTSC signals and DTV signals using the same transmission channels will take place, although DTV cablecasting will not be done in accordance with the same ATSC standard used for terrestrial over-the-air broadcasting. At this time DTV cablecasting is done using quadrature-amplitude-modulation (QAM) signals rather than the vestigial sideband (VSB) signals advocated by the ATSC standard. Receivers both for terrestrial over-the-air broadcast DTV and for cable DTV have been proposed which use a common first detector for both modes of reception; and the two modes of reception have been distinguished in various ways, usually relying on features of the ATSC VSB signal for terrestrial over-the-air broadcast DTV that are not found in the QAM signal. If this is done, the distinction between the reception of an NTSC signal and a DTV cannot be predicated, at least not primarily, on the non-existence of distinctive features of the ATSC VSB signal. This is because those distinctive features are also absent during the reception of QAM DTV signals.

One can attempt to ascertain reception of an NTSC signal by detecting the presence of NTSC video carrier at the video detector of the NTSC receiver portion of the NTSC/DTV receiver. However, components near NTSC carrier frequency may occur as components of DTV signal or of wideband noise in a vacant transmission channel, resulting in erroneous indications of NTSC reception.

One can attempt to ascertain reception of an NTSC signal by detecting the presence of NTSC audio carrier. In this method also, erroneous indications of NTSC reception may result from detecting wideband noise in a vacant transmission channel.

SUMMARY OF THE INVENTION

The invention is embodied in an NTSC/DTV receiver the NTSC receiver portion of which uses 4.5 MHz intercarrier sound intermediate-frequency signal generated by the heterodyne between NTSC video and audio carriers. The 4.5 MHz intercarrier sound I-F signal is continuously generated only when both the NTSC video and audio carriers simultaneously occur. There is no such simultaneous occurrence in a VSB DTV signal or a QAM DTV signal. The presence or absence of 4.5 MHz intercarrier sound I-F signal is detected for indicating whether or not an NTSC signal is being currently received by the NTSC/DTV receiver.

BRIEF DESCRIPTION OF THE DRAWING

The sole figure is a block schematic diagram of portions of television signal reception apparatus for receiving NTSC analog television signals, VSB DTV signals as used in over-the-air terrestrial broadcasting and QAM DTV signals as used in cablecasting and direct satellite broadcasting, which portion for receiving NTSC analog television signals in accordance has a detector associated therewith for determining whether or not there is substantial 4.5 MHz intercarrier sound intermediate-frequency signal generated therewithin for indicating whether or not NTSC analog television signals are being currently received.

DETAILED DESCRIPTION

In FIG. 1 antenna 1 represents all sources of radio-frequency television signals to television signal reception apparatus comprising a VSB DTV receiver portion 2, a QAM DTV receiver portion 3, and an NTSC receiver portion 4. By way of examples, this TV signal reception apparatus may be included in a television set with a viewing screen and apparatus responsive to received baseband signals for creating images on the viewscreen, or this television signal reception apparatus may be included in a digital video recording apparatus. These receiver portions 2–4 preferably share a first mixer and may share intermediate-frequency amplifier circuitry and possibly a further mixer. Various arrangements of this type are described by A. L. R. Limberg in U.S. patent application Ser. No. 08/820,193 filed Mar. 19, 1997 and entitled "DIGITAL-AND-ANALOG-TV-SIGNAL RECEIVERS, EACH WITH SINGLE FIRST DETECTOR AND SHARED HIGH-BAND I-F AMPLIFICATION"; in U.S. patent application Ser. No. 08/825,711 filed Mar. 19, 1997 and entitled "RADIO RECEIVER DETECTING DIGITAL AND ANALOG TELEVISION RADIO-FREQUENCY SIGNALS WITH SINGLE FIRST DETECTOR"; and in a similarly titled U.S. patent application Ser. No. 09/003,513 filed Jan. 6, 1998.

In FIG. 1 the VSB DTV receiver portion 2, the QAM DTV receiver portion 3, and the NTSC receiver portion 4 supply baseband signals to analog-to-digital converters (ADCs) 5, 6 and 7, respectively, but in practice digitization may be done before baseband detection. U.S. Pat. No. 5,479,449 entitled "DIGITAL VSB DETECTOR WITH BANDPASS PHASE TRACKER, AS FOR INCLUSION IN AN HDTV RECEIVER", which issued Dec. 26, 1995 to C. B. Patel and A. L. R. Limberg, describes a triple-conversion TV receiver for VSB DTV signals in which receiver final intermediate-frequency signals are digitized and the resulting digital IF signals are synchrodyned to baseband in the digital regime. Digitization of final intermediate-frequency signals and then synchrodyning them to baseband in the digital regime is also practical for QAM DTV signals, as described in U.S. Pat. No. 5,506,636 entitled "HDTV SIGNAL RECEIVER WITH IMAGINARY-SAMPLE-PRESENCE DETECTOR FOR QAMVSB MODE SELECTION" and issued Apr. 9, 1996 to C. B. Patel and A. L. R. Limberg. Digitization of either VSB or QAM DTV final intermediate-frequency signals and then synchrodyning them to baseband in the digital regime is further described in U.S. Pat. No. 5,715,012 issued to C. B. Patel and A. L. R. Limberg on Feb. 3, 1998 and entitled "RADIO RECEIVERS FOR RECEIVING BOTH VSB AND QAM DIGITAL HDTV SIGNALS". Digitization of either VSB or QAM DTV final intermediate-frequency signals and then synchrodyning them to baseband in the digital regime is still further described in U.S. patent application Ser. No. 08/773,949 filed by C. B. Patel and A. L. R. Limberg on Dec. 26, 1996 and entitled "RADIO RECEIVERS FOR RECEIVING BOTH VSB AND QAM DIGITAL HDTV SIGNALS" as a continuation-in-part of U.S. patent applications Nos. 08/266,753 and 08/614,471.

A concern in the design of the NTSC receiver portion 4 is the suppression of co-channel interference from VSB DTV signals. So, the NTSC receiver portion 4 preferably is of a form like that described in detail by A. L. R. Limberg in U.S. Pat. No. 5,786,870 issued Jul. 28, 1998, entitled "NTSC VIDEO SIGNAL RECEIVERS WITH REDUCED SENSITIVITY TO INTERFERENCE FROM CO-CHANNEL DIGITAL TELEVISION SIGNALS" and incorporated herein by reference.

The digital baseband response from the QAM DTV receiver portion is formatted to time-interleave in-phase and quadrature-phase samples in one of the input signals to a multiplexer 8. In the FIG. 1 DTV receiver this interleaving is done incidentally to analog-to-digital conversion of the analog response from the QAM DTV receiver portion 3. The ADC 6 is arranged to select its input samples alternately from the analog in-phase response of the QAM DTV receiver portion 3 and from the analog quadrature-phase response of the QAM DTV receiver portion 3.

The digital baseband responses from the VSB DTV receiver portion, the QAM DTV receiver portion, and the NTSC receiver portion are applied as input signals to the multiplexer 8, which selects one of these digital baseband responses as input signal for adaptive ghost-cancellation filter circuitry 9. The adaptive ghost-cancellation filter circuitry 9 is used to filter response from a selected one of the respective digitized baseband responses of the VSB DTV receiver portion 2, the QAM DTV receiver portion 3, and the NTSC receiver portion 4. The multiplexer 8 makes this selection responsive to selection signals supplied by logic circuitry 10 used for deciding the current mode of reception from the received signal. The multiplexer 8 may comprise three banks of tri-states. When the logic circuitry 10 supplies a signal indicating the reception of a VSB DTV signal, a first of these banks of tri-states supplies the bits of the digital response of ADC 5 at low source impedances to the input port of the ghost-cancellation filter circuitry 9 as applied input signal thereto. When the logic circuitry 10 supplies a signal indicating the reception of a QAM DTV signal, a second bank of these tri-states supplies the bits of the digital response of ADC 6 at low source impedances to the input port of the ghost-cancellation filter circuitry 9. When the logic circuitry 10 supplies a signal indicating the reception of an NTSC analog TV signal, a third bank of these tri-states supplies the bits of the digital response of ADC 7 at low source impedances to the input port of the ghost-cancellation filter circuitry 9 as applied input signal thereto.

If a VSB DTV pilot signal accompanies the signal received by the FIG. 1 portion of the TV set, a DTV pilot carrier detector 11 associated with the VSB DTV receiver portion 2 responds to this condition to indicate the reception of a VSB DTV signal. The DTV pilot carrier detector 11 can be one which responds to the baseband response of the VSB DTV receiver portion 2 exhibiting a direct offset owing to synchronous detection of the pilot carrier accompanying the VSB DTV signal, for example. The logic circuitry 10 responds to this indication for conditioning the first bank of tri-states in the multiplexer 8 to apply the bits of the digital response of ADC 7 at low source impedances to the input port of the ghost-cancellation filter circuitry 9.

If an NTSC signal of substantial strength is received by the FIG. 1 portion of the TV set, an intercarrier sound carrier detector 12 associated with the NTSC receiver portion 4 responds to pronounced 4.5 MHz intercarrier generated responsive to this condition for indicating the reception of a NTSC analog TV signal. The logic circuitry 10 responds to the intercarrier sound carrier detector 12 indication of pronounced 4.5 MHz intercarrier generation for conditioning the third bank of tri-states in the multiplexer 8 to apply the bits of the digital response of ADC 7 at low source impedances to the input port of the ghost-cancellation filter circuitry 9. The intercarrier sound carrier detector 12 can be of a type detecting whether the level of 4.5 MHz intercarrier sound intermediate-frequency prior to any limiter or limiter-amplifier therefor exceeds or does not exceed a prescribed threshold level. Alternatively, the intercarrier sound carrier detector 12 can be of a type detecting amplitude variations of sound I-F limiter-amplifier response caused by failure of sustained 4.5 MHz intercarrier generation. This latter alternative avoids the need for selective filtering other than that used in the sound I-F limiter-amplifier, which avoidance is desirable in designs using monolithic integrated circuitry.

The FIG. 1 portion of the TV set is constructed so that if a QAM DTV signal of sufficient strength to be useful is received, a threshold detector 13 will respond to the development of an automatic gain control (AGC) signal in the QAM DTV receiver portion 3 of the TV set shown in part in FIG. 1. If there are no indications of VSB DTV signal reception or of NTSC analog TV signal reception from the detectors 11 and 12, but the receiver exhibits automatic gain control responsive to QAM signals being received, the logic circuitry 10 presumes that QAM DTV reception takes place and conditions the second bank of tri-states in the multiplexer 8 to apply the bits of the digital response of ADC 6 at low source impedances to the input port of the ghost-cancellation filter circuitry 9.

If the receiver does not exhibit automatic gain control or AGC responsive to QAM signals being received, the logic circuitry 10 presumes that no useful signal is being received and does not condition any of the first, second and third banks of tri-states in the multiplexer 8 to apply bits from low source impedances to the input port of the ghost-cancellation filter circuitry 9. The input port of the ghost-cancellation filter circuitry 9 can be arranged to have a null input signal during such condition.

The output port of the ghost-cancellation filter circuitry 9 supplies signal to a computer 14 used for calculating weighting coefficients for the component digital filters in the circuitry 9. As will be described in greater detail further on in this specification, during the reception of VSB DTV signal and during the reception of NTSC analog TV signal, the computer 14 will select portions of the received signal containing a ghost-cancellation reference signal on which to base calculations of initial weighting coefficients for the component digital filters in the circuitry 9. A read-only memory (ROM) 15 is associated with the computer for storing a priori knowledge of the preferred form(s) for the selected portions of the received signal as they would be were they to be received without attending ghosts. At the time of filing this application the ghost-cancellation reference signals for NTSC analog TV and for ATSC DTV differ, but in accordance with an aspect of the invention it is desirable for the ghost-cancellation reference signals for NTSC analog TV and for ATSC DTV to resemble each other so that the ROM 15 can be constructed without need for as much storage capability.

A sampling clock generator 16 also referred to as a symbol clock generates the sampling clock signals used by the ADCs 5, 6 and 7. The rate of the sampling clock signals is preferably a multiple of the symbol rate for DTV signals, with the multiple preferably being an integral power of two. This facilitates a symbol counter 17 counting the sampling clock signals to derive a count of the number of symbols per line—that is, the number of symbols per data segment in the case of DTV signals and the arbitrary number of symbols per horizontal scan line in the case of analog TV signals. The count of the number of symbols per line is reset on the next sampling clock signal after a full count of the number of symbols per horizontal scan line is reached. A scan line or data segment counter 18 responds to full count indications from the symbol counter 17 to count the number of data segments per data field in the case of DTV signals and the number of horizontal scan lines per image field in the case of analog TV signals. This count is reset after symbol counter 17 reaches a full count of the number of symbols per horizontal scan line after the counter 18 reaches a fall count of the number of data segments per data field in the case of DTV signals and the number of horizontal scan lines per image field in the case of analog TV signals. The computer 14 responds to a prescribed line count from the counter 18 to read from the ROM 15 using the symbol count from the symbol counter 17 as read addressing. A count-resets controller 19 determines for the type of TV signal currently being received what the full counts shall be for the counters 17 and 18; the count-resets controller 19 also determines the correct phasings of the symbol count and line count the counters 17 and 18 respectively provide. These counts are used by the computer 14 to govern its selection of the portions of the received signal containing GCR signal on which to base calculations of weighting coefficients for the component digital filters in the circuitry 9.

The sampling clock generator 16 contains a master clock oscillator receiving frequency and phase control (AFPC) signal from the output port of a multiplexer 20 which selects that AFPC signal from an appropriate source for the type of signal currently being received. The multiplexer 20 makes this selection responsive to the selection signals supplied by logic circuitry 10. The output port of the ghost-cancellation filter circuitry 9 supplies signal to a VSB symbol synchronizer 21 supplying a first source of AFPC signal to a first input port of the multiplexer 20, to a QAM symbol synchronizer 22 supplying a second source of AFPC signal to a second input port of the multiplexer 20, and to a color burst phase detector 23 supplying a third source of AFPC signal to a first input port of the multiplexer 20.

A local color oscillator 24 supplies the color burst phase detector 23 with color subcarrier for synchronously detecting gated color burst. The local color oscillator 24 is also referred to as a subharmonic lock color oscillator 24, locked to a subharmonic of the oscillations of the master clock oscillator in the sampling clock generator 16. This can be accomplished by detecting zero crossings of the oscillations of the master clock oscillator, counting the detected zero crossings in a binary counter, and using the square wave generated as the most significant bit of the count to phase-lock the color oscillator 24. Phase locking of the color oscillator 24 can be done using injection lock or quadricorrelation procedures. NTSC vertical and horizontal sync detection circuitry 25 also referred to an NTSC VTH detector responds to baseband composite video signal from the NTSC receiver portion 4 of the television receiver apparatus for detecting the occurrences of horizontal sync pulses and field retrace times. These detection results are supplied to the count resets controller 19 and, when the logic circuitry 10 supplies the count resets controller 19 a signal indicating the reception of an analog TV signal, the controller 19 is conditioned to use these detection results for determining when the counters 17 and 18 are to be reset to initial count conditions. This phases the symbol and sync counts so the computer 14 can at appropriate times read from the ROM 15 a ghost-free ghost-cancellation reference signal for analog TV. The output port of the ghost-cancellation filter circuitry 9 supplies input signal to an NTSC composite video signal processor 26, which generates color signals for application to the remainder of the television receiver apparatus.

When the logic circuitry 10 supplies a signal indicating the reception of a VSB DTV signal, the multiplexer 20 is conditioned to supply the master oscillator in the sampling clock generator with AFPC signal from the VSB symbol synchronizer 21. The VSB symbol synchronizer 21 preferably includes a filter for selecting 5.38 MHz half-symbol-rate components from the ghost-cancellation filter circuitry 9 response and circuitry for doubling or quadrupling the selected half-symbol-rate component for comparison with frequency-divided oscillations from the master clock oscillator to generate AFPC signal for the master clock oscillator. When the logic circuitry 10 supplies a signal indicating the reception of a QAM DTV signal, the multiplexer 20 is conditioned to supply the master oscillator in the sampling clock generator with AFPC signal from the QAM symbol synchronizer 22. The QAM symbol synchronizer 21 preferably includes a filter for selecting 2.39 MHz half-symbol-rate components from the ghost-cancellation filter circuitry 9 response and circuitry for doubling or quadrupling the selected half-symbol-rate component for comparison with frequency-divided oscillations from the master clock oscillator to generate AFPC signal for the master clock oscillator. When the logic circuitry 10 supplies a signal indicating the reception of an NTSC analog TV signal, the multiplexer 20 is conditioned to supply the master oscillator in the sampling clock generator with AFPC signal from the color burst phase detector 21.

The output port of the ghost-cancellation filter circuitry 9 supplies input signal to a VSB DTV symbol decoder 27, which generates a binary code stream for application to the remainder of the television receiver apparatus. The output port of the ghost-cancellation filter circuitry 9 also supplies input signal to circuitry 28 for detecting the occurrences of line sync codes and field sync codes. These detection results are supplied to the count resets controller 19 and, when the logic circuitry 10 supplies the count resets controller 19 a signal indicating the reception of a VSB DTV signal, the controller 19 is conditioned to use these detection results for determining when the counters 17 and 18 are to be reset to initial count conditions. This phases the symbol and sync counts so the computer 14 can at appropriate times read from the ROM 15 ghost-free ghost-cancellation reference signal for VSB DTV stored in ROM 15.

The output port of the ghost-cancellation filter circuitry 9 supplies input signal to a QAM DTV symbol decoder 29, which generates a binary code stream for application to the remainder of the television receiver apparatus. The output port of the ghost-cancellation filter circuitry 9 supplies input signal to circuitry 30 for detecting the occurrences of line sync codes and field sync codes. These detection results are supplied to the count resets controller 19 and, when the logic circuitry 10 supplies the count resets controller 19 a signal indicating the reception of a QAM DTV signal, the controller 19 is conditioned to use these detection results for determining when the counters 17 and 18 are to be reset to initial count conditions. In case that cablecast standards are developed in which the QAM includes ghost-cancellation reference signal, this will phase the symbol and sync counts so the computer 14 can read from the ROM 15 at appropriate times ghost-free ghost-cancellation reference signal for QAM DTV.

During analog TV reception AGC signal for the NTSC receiver portion 2 can be developed conventionally, in response to peak detection of horizontal sync tips. To forestall AGC lock-out, the NTSC vertical and horizontal synchronization circuitry 25 draws its input signal from the baseband response of the NTSC receiver portion 4 directly as shown in FIG. 1 or, alternatively, from that response as digitized by the ADC 7. During VSB DTV reception AGC signal for the VSB receiver portion 2 is preferably developed from the direct component of the baseband response of the VSB DTV receiver portion 2 arising from the synchronous detection of the pilot carrier, as described by C. B. Patel and A. L. R. Limberg in U.S. Pat. No. 5,636,252 entitled "AUTOMATIC GAIN CONTROL OF RADIO RECEIVER FOR RECEIVING DIGITAL HIGH-DEFINITION TELEVISION SIGNALS" issued Jun. 3, 1997. During QAM DTV reception, AGC signal is preferably developed as described by A. L. R. Limberg in U.S. Pat. No. 5,805,241 issued Sep. 8, 1998, entitled "NOISE-IMMUNE AUTOMATIC GAIN CONTROL FOR QAM RADIO RECEIVERS" and incorporated herein by reference. Alternatively, AGC signal is developed during VSB and/or QAM DTV reception by amplitude detection of modulation peaks.

A number of different arrangements of computer 14 and adaptive ghost-cancellation filter circuitry 9 elements are known to be possible; and the selection of which of these arrangements depends in certain degree upon the ghost-cancellation reference signals that are finally accepted as standard. The ghost-cancellation filter circuitry 9 that is usually preferred cascades an infinite-impulse-response (IIR) digital filter for canceling post-ghosts with substantial delay after a finite-impulse-response (FIR) digital filter for canceling post-ghosts with little delay, canceling pre-ghosts and implementing channel equalization after separately defined ghosts are substantially canceled. The IIR filter typically includes a digital subtracter supplying its difference output signal as a response of the IIR filter, receiving the response of the previous FIR filter as minuend input signal, and receiving as subtrahend input signal the IIR filter response via a recursive feedback path that includes a component FIR filter. This component FIR filter has many zero weighting coefficients in its kernel, which lends it to being designed to have a specialized construction using programmable bulk delay.

Ideally, when DTV signals are being received, the IIR filter response will switch between certain well-defined signal levels associated with respective symbol codes. The IIR filter response can be compared with that response as quantized to ones of these well-defined signal levels, for generating error signals to support decision-feedback equalization (DFE) methods of adjusting the coefficients in the kernels of the adaptive ghost-cancellation filter circuitry 9. As long as QAM DTV signals are transmitted without GCR signals, DFE methods have to be used when receiving QAM DTV signals. So-called "blind" equalization, which does not rely on a priori knowledge of the transmission channel has to be used for initial adjustment of the weighting coefficients of the ghost-cancellation filter circuitry 9 when a QAM DTV channel is first tuned to. Blind equalization is subject to stalling when the gradient-following procedure used for converging the ghost-cancellation filter circuitry 9 reach localized false minima called "saddlepoints" rather than the ultimate minimum the procedure is supposed to reach. Blind equalization is often a slow procedure when the transmission channel is badly ghosted as it is apt to be when receiving terrestrial over-the-air broadcasts. When VSB DTV signals are received, blind equalization is therefore eschewed in favor of initializing the filter coefficients of the ghost-cancellation filter circuitry 9 based on a training signal or ghost-cancellation (GCR) signal. After such initialization, DFE methods are advantageously used for adjusting the filter coefficients of the ghost-cancellation filter circuitry 9 so as to track changes in multipath reception conditions.

Decision-feedback equalization methods using a continuous least-mean-squares (LMS) weighting-coefficient-error minimization algorithm, as modified to facilitate calculation in substantially real time, are described by A. L. R. Limberg in U.S. patent application Ser. No. 08/832,674 filed Apr. 8, 1997 and entitled "DYNAMICALLY ADAPTIVE EQUALIZER SYSTEM AND METHOD". U.S. Pat. No. 5,648,987 issued Jul. 15, 1997 to J. Yang, C. B. Patel, T. Liu and A. L. R. Limberg and entitled "RAPID-UPDATE ADAPTIVE CHANNEL-EQUALIZATION FILTERING FOR DIGITAL RADIO RECEIVERS, SUCH AS HDTV RECEIVERS" describes preferred DFE methods employing the block-LMS weighting-coefficient-error minimization algorithm method, as modified to facilitate calculation in substantially real time. C. M. Zhao, X. Y. Hu and X. H. Yu indicate in their September 1998 paper "Block Sequential Least Squares Decision Feedback Equalization Algorithm with Application to Terrestrial HDTV Transmission" appearing in IEEE Transactions on Broadcasting, Vol. 44, No. 3, that using block-sequential LMS optimization procedures rather than continuous LMS optimization procedures permits a bit error rate of $3 \times 10^{-9}$ to be achieved with signals having 3.5 dB poorer signal-to-noise ratio.

It is customary to include the quantizer in the recursive feedback path of the IIR filter when DTV signals are being received and decision-feedback methods are used for adjusting the coefficients of the adaptive ghost-cancellation filter circuitry 9. NTSC analog television signals do not switch between certain well-defined signal levels and so do not lend themselves to decision-feedback methods in which the IIR filter response is compared with that response as quantized to ones of these well-defined signal levels. Any quantizer included in the recursive feedback path of the IIR filter during DTV reception is excluded from that path when NTSC analog television signals are being received.

The Bessel chirp that is the current defacto standard GCR signal in NTSC analog TV can be used for adjusting the filter co efficients of the ghost-cancellation filter circuitry 9. This requires the computer 14 to be capable of calculating weighting coefficients for the adaptive ghost-cancellation filter circuitry 9 by steps of performing discrete Fourier transform (DFT) analysis of the filter circuitry 9 response to the Bessel function, characterizing the channel by dividing the elements of the DFT response by corresponding elements of the DFT of the ghost-free Bessel chirp as subjected to lowpass filtering descriptive of ideal channel characteristics, and complementing the DFT characterizing the channel to make a current determination of the weighting coefficients of the filter circuitry 9. After initially determining the weighting coefficients of the filter circuitry 9 when a transmission channel is first received, these coefficients can be updated by comparing the current determinations of these coefficients with previous determinations to generate error signals and then accumulating fractions of these error signals into the previous determinations of these coefficients to accomplish the updating. The reader is referred to U.S. Pat. No. 5,331,416 entitled "METHODS FOR OPERATING GHOST-CANCELATION CIRCUITRY FOR TV RECEIVER OR VIDEO RECORDER", which issued Jul. 19, 1994 to C. B. Patel and J. Yang, for details concerning calculation of the weighting coefficients for the adaptive ghost-cancellation filter circuitry 9 using DFT methods.

The middle PN63 sequence included in DFS signal of the 1995 ATSC DTV standard, as separated by differentially combining corresponding samples of successive field synchronization code sequences, can be the basis for initializing the weighting coefficients of the filter circuitry 9 using DFT methods. Initializing the weighting coefficients this way avoids the problem encountered with DFE methods that the gradient-following procedure used for converging filter coefficients stalls in localized false minima called "saddlepoints" rather than reaching the desired real minimum. After initializing the weighting coefficients of the filter circuitry 9 using DET methods it can be advantageous to switch over to using DFE methods to reduce any errors that thereafter occur in weighting coefficients, since DFE methods tend better to follow rapidly varying ghosting conditions (e. g., aircraft flutter).

U.S. Pat. No. 5,600,380 entitled "GHOST-CANCELATION REFERENCE SIGNAL ACQUISITION CIRCUITRY, AS FOR TV RECEIVER OR VIDEO RECORDER", which issued Feb. 4, 1997 to C. B. Patel and J. Yang, is incorporated herein by reference for its detailed description of circuitry for separating first and second component GCR signals from NTSC signals. This circuitry is readily adapted for separating first and second component GCR signals from ATSC signals.

In the claims which follow, the various receiver portions included in each television signal reception apparatus may include shared elements used in common by at least two of those receiver portions. In the claims which follow, the word "said" is used to indicate antecedence rather than the word "the", which is used for other grammatical purposes.

What is claimed is:

1. An NTSC/DTV television signal reception apparatus for receiving transmitted television signals of NTSC type and of at least first and second digital types, said television signal reception apparatus comprising:

a receiver portion for supplying a first baseband signal responsive to an NTSC television signal received during first times, which receiver portion includes circuitry for generating a 4.5 MHz intercarrier sound intermediate-frequency signal;

a receiver portion for supplying a second baseband signal responsive to a digital television signal of said first digital type received during second times;

a receiver portion for supplying a third baseband signal responsive to a digital television signal of said second digital type received during third times;

a carrier amplitude detector for responding to a pronounced 4.5 MHz intercarrier sound intermediate-frequency signal being continuously generated to supply an indication of the reception of an NTSC analog TV signal;

circuitry for selectively processing said second baseband signal, said processing of said second baseband signal normally being enabled but being subject to disablement, said processing of said second baseband signal being disabled in response to said carrier amplitude detector supplying said indication of the reception of an NTSC analog TV signal;

circuitry for selectively processing said third baseband signal, wherein said television signals of said second digital type contain a pilot carrier of specific frequency that said television signals of said first digital type do not; and a pilot carrier detector for detecting the reception of said pilot carrier of specific frequency to supply indication of the reception of a television signal of said second digital type and for otherwise withholding said indication of the reception of a television signal of said second digital type, wherein said circuitry for selectively processing said second baseband signal is of a type that is disabled in response to said pilot carrier detector supplying said indication of the reception of said pilot carrier of specific frequency, and said circuitry for selectively processing said third baseband signal is of a type that is enabled only in response to said pilot carrier detector supplying said indication of the reception of said pilot carrier of specific frequency.

2. The NTSC/DTV television signal reception apparatus of claim 1, said processing of said third baseband signal normally being disabled but being subject to enablement.

3. The NTSC/DTV television signal reception apparatus of claim 2, said processing of said third baseband signal normally being disabled but being subject to enablement.

4. An NTSC/DTV television signal reception apparatus for receiving transmitted television signals of NTSC type and of at least first and second digital types, said television signal reception apparatus comprising:

a receiver portion for supplying a first baseband signal responsive to an NTSC television signal received during first times, which receiver portion includes circuitry for generating a 4.5 MHz intercarrier sound intermediate-frequency signal;

a receiver portion for supplying a second baseband signal responsive to a digital television signal of said first digital type received during second times;

a receiver portion for supplying a third baseband signal responsive to a digital television signal of said second digital type received during third times;

a carrier amplitude detector for responding to a pronounced 4.5 MHz intercarrier sound intermediate-frequency signal being continuously generated to supply indication of the reception of an NTSC analog TV signal and for otherwise withholding said indication of the reception of an NTSC analog TV signal;

circuitry for selectively processing said second baseband signal, said processing of said second baseband signal being disabled in response to said carrier amplitude detector supplying said indication of the reception of an NTSC analog TV signal;

is circuitry for selectively processing said third baseband signal, wherein said television signals of said second digital type contain a pilot carrier of specific frequency that said television signals of said first digital type do not; and a pilot carrier detector for detecting the reception of said pilot carrier of specific frequency to supply indication of the reception of a television signal of said second digital type and for otherwise withholding said indication of the reception of a television signal of said second digital type, wherein said circuitry for selectively processing said second baseband signal is of a type that is disabled in response to said pilot carrier detector supplying said indication of the reception of said pilot carrier of specific frequency, and said circuitry for selectively processing said third baseband signal is of a type that is enabled only in response to said pilot carrier detector supplying said indication of the reception of said pilot carrier of specific frequency.

5. The NTSC/DTV television signal reception apparatus of claim 4, said processing of said second baseband signal normally being enabled but being subject to disablement.

6. An NTSC/DTV television signal reception apparatus for receiving transmitted television signals of NTSC type and of at least first and second digital types, said television signal reception apparatus comprising:

a receiver portion for supplying a first baseband signal responsive to an NTSC television signal received during first times, which receiver portion includes circuitry for generating a 4.5 MHz intercarrier sound intermediate-frequency signal;

a receiver portion for supplying a second baseband signal responsive to a digital television signal of said first digital type received during second times;

a receiver portion for supplying a third baseband signal responsive to a digital television signal of said second digital type received during third times;

a carrier amplitude detector for responding to a pronounced 4.5 MHz intercarrier sound intermediate-frequency signal being continuously generated to supply indication of the reception of an NTSC analog TV signal and for otherwise withholding said indication of the reception of an NTSC analog TV signal;

circuitry for selectively processing said second baseband signal, said processing of said second baseband signal normally being enabled but being subject to disablement, said processing of said second baseband signal being disabled in response to said carrier amplitude detector supplying said indication of the reception of an NTSC analog TV signal;

circuitry for selectively processing said third baseband signal, said processing of said third baseband signal normally being disabled but being subject to enablement, wherein said television signals of said second digital type contain a pilot carrier of specific frequency that said television signals of said first digital type do not; and a pilot carrier detector for detecting the reception of said pilot carrier of specific frequency to supply indication of the reception of a television signal of said second digital type and for otherwise withholding said indication of the reception of a television signal of said second digital type, wherein said circuitry for selectively processing said second baseband signal is of a type that is also disabled in response to said pilot carrier detector supplying said indication of the reception of said pilot carrier of specific frequency, and said circuitry for selectively processing said third baseband signal is of a type that is enabled only in response to said pilot carrier detector supplying said indication of the reception of said pilot carrier of specific frequency.

7. The NTSC/DTV television signal reception apparatus of claim 6, wherein said receiver portion for supplying a second baseband signal responsive to a digital television signal of said first digital type received during second times is of a type subject to automatic gain control as the strength of received signal of said first digital type exceeds a prescribed level.

8. The NTSC/DTV television signal reception apparatus of claim 7, wherein said NTSC/DTV television signal reception apparatus further comprises a detector for generating an indication of when said receiver portion for supplying a second baseband signal receives a digital television signal of said first digital type of sufficient strength to begin automatic gain control signal, and wherein said circuitry for selectively processing said second baseband signal is of a type that is also disabled responsive to said indication of when said receiver portion for supplying a second baseband signal receives a digital television signal of said first digital type of sufficient strength to begin automatic gain control signal not being generated.

* * * * *